US012368365B2

(12) United States Patent
Mori et al.

(10) Patent No.: US 12,368,365 B2
(45) Date of Patent: Jul. 22, 2025

(54) POWER CONVERSION DEVICE AND ELECTRIC POWER STEERING DEVICE

(71) Applicant: Mitsubishi Electric Corporation, Tokyo (JP)

(72) Inventors: Tatsuya Mori, Tokyo (JP); Hiroko Ikeda, Tokyo (JP); Kenta Kubo, Tokyo (JP); Yu Hirotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 272 days.

(21) Appl. No.: 18/011,739

(22) PCT Filed: Jul. 22, 2020

(86) PCT No.: PCT/JP2020/028370
§ 371 (c)(1),
(2) Date: Dec. 20, 2022

(87) PCT Pub. No.: WO2022/018841
PCT Pub. Date: Jan. 27, 2022

(65) Prior Publication Data
US 2023/0318488 A1    Oct. 5, 2023

(51) Int. Cl.
*H02M 1/00*    (2007.01)
*H02M 1/12*    (2006.01)
*H02M 7/5395*    (2006.01)

(52) U.S. Cl.
CPC ....... *H02M 1/0009* (2021.05); *H02M 1/0022* (2021.05); *H02M 1/12* (2013.01); *H02M 7/5395* (2013.01)

(58) Field of Classification Search
CPC .............................. H02M 1/0009; H02M 1/12
See application file for complete search history.

(56) References Cited

U.S. PATENT DOCUMENTS

2004/0189221 A1*  9/2004  Kurosawa ................ H02P 6/28
                                             318/400.04
2007/0165431 A1*  7/2007  Gunji ..................... H02P 27/08
                                                  363/98

(Continued)

FOREIGN PATENT DOCUMENTS

JP    2009017671 A  *  1/2009
JP    4942569 B2      5/2012
JP    6266161 B2      1/2018

OTHER PUBLICATIONS

International Search Report of PCT/JP2020/028370 dated Oct. 6, 2020.

*Primary Examiner* — Gustavo A Rosario-Benitez
(74) *Attorney, Agent, or Firm* — Sughrue Mion, PLLC

(57) ABSTRACT

If a current detection resistance is connected between a lower-arm switching element and a negative-electrode-side input terminal of an inverter, a conduction resistance between an output terminal and a positive-electrode-side input terminal of the inverter is set to be higher than a conduction resistance obtained by excluding the current detection resistance from a conduction resistance between the output terminal and the negative-electrode-side input terminal of the inverter. If the current detection resistance is connected between an upper-arm switching element and the positive-electrode-side input terminal, the conduction resistance between the output terminal and the negative-electrode-side input terminal of the inverter is set to be higher than a conduction resistance obtained by excluding the current detection resistance from the conduction resistance between the output terminal and the positive-electrode-side input terminal of the inverter.

18 Claims, 12 Drawing Sheets

(56) References Cited

U.S. PATENT DOCUMENTS

| | | | | |
|---|---|---|---|---|
| 2011/0005855 A1* | 1/2011 | Mikamo | ............. | H02P 21/22 |
| | | | | 318/722 |
| 2014/0225547 A1* | 8/2014 | Yokozutsumi | ........ | H02P 27/085 |
| | | | | 318/722 |
| 2016/0308524 A1* | 10/2016 | Inoue | ............. | H03K 17/168 |
| 2018/0234032 A1* | 8/2018 | Araki | ............. | H02M 7/53871 |
| 2018/0022378 A1 | 12/2018 | Furukawa | | |
| 2020/0373854 A1* | 11/2020 | Tanaka | ............. | H02M 1/12 |
| 2021/0114652 A1* | 4/2021 | Mori | ............. | H02P 29/50 |

* cited by examiner

POWER CONVERSION DEVICE AND ELECTRIC POWER STEERING DEVICE

This is a National Stage of Application No. PCT/JP2020/028370 filed Jul. 22, 2020.

TECHNICAL FIELD

The present disclosure relates to a power conversion device and an electric power steering device.

BACKGROUND ART

Technologies in Patent Document 1 have been known as a conventional power conversion device and electric power steering device. In the said document, configuring is performed so as to detect a current on the basis of an output signal from a current detection resistance element connected in series to a switching element on a negative electrode side of an inverter. This inverter is called a "lower arm three-shunt current detection type inverter". In addition, an inverter employing a current detection type called a busbar one-shunt current detection type, i.e., a "busbar one-shunt current detection type inverter", has also been spread for the purpose of further reduction in cost for the devices.

Inverters employing these current detection types require lower costs for current detection than inverters employing current detection types in which a DC current sensor (DC-CT) is used, and thus have been widespread in the industry.

CITATION LIST

Patent Document

Patent Document 1: Japanese Patent No. 6266161

SUMMARY OF THE INVENTION

Problems to be Solved by the Invention

Many of lower arm three-shunt current detection type inverters and busbar one-shunt current detection type inverters each have a current detection resistance interposed between a negative-electrode-side input terminal and a lower-arm switching element of the inverter. As a result, a conduction resistance between an output terminal and the negative-electrode-side input terminal of the inverter becomes higher than a conduction resistance between the output terminal and a positive-electrode-side input terminal of the inverter correspondingly to the interposed current detection resistance.

When a third-order harmonic component is superimposed on a voltage command value related to a voltage of the inverter, the current detection resistance might cause an interphase voltage, outputted from the inverter, to include a third-order harmonic component (third-order voltage error) and might cause a current, conducted through an inductive load connected to the output terminal of the inverter, to include a third-order harmonic component with respect to a fundamental wave of the current.

Thus, if, for example, an AC rotating machine is used as the inductive load, a third-order torque ripple is generated with respect to a fundamental wave for the AC rotating machine. As a result, problems such as irregularity in rotation of the AC rotating machine, or vibrations or noises of the AC rotating machine, arise.

The present disclosure has been made to solve the above problems, and an object of the present disclosure is to provide a power conversion device that enables reduction in influence of a third-order of a third-order harmonic.

Solution to the Problems

A power conversion device according to the present disclosure includes:
  an inverter which has an upper-arm switching element and a lower-arm switching element and which converts DC voltage into AC voltage and outputs the AC voltage to a load;
  a voltage command value calculation unit which calculates a voltage command value for controlling the load to take a commanded state; and
  a corrected voltage command value calculation unit which calculates a corrected voltage command value by adding, to a fundamental wave component of the voltage command value, a third-order harmonic component which is a component having a frequency that is three times a frequency of the fundamental wave component,
wherein
  the inverter performs conversion into the AC voltage on the basis of the corrected voltage command value,
  if a current detection resistance is connected between the lower-arm switching element and a negative-electrode-side input terminal of the inverter, a conduction resistance between an output terminal and a positive-electrode-side input terminal of the inverter is set to be higher than a value obtained by excluding the current detection resistance from a conduction resistance between the output terminal and the negative-electrode-side input terminal of the inverter, and
  if the current detection resistance is connected between the upper-arm switching element and the positive-electrode-side input terminal, the conduction resistance between the output terminal and the negative-electrode-side input terminal of the inverter is set to be higher than a value obtained by excluding the current detection resistance from the conduction resistance between the output terminal and the positive-electrode-side input terminal of the inverter.

Effect of the Invention

The power conversion device according to the present disclosure enables reduction in influence of a third-order harmonic, in an output from the inverter, caused by superimposition of a third-order harmonic component.

DESCRIPTION OF EMBODIMENTS

Figure 1:
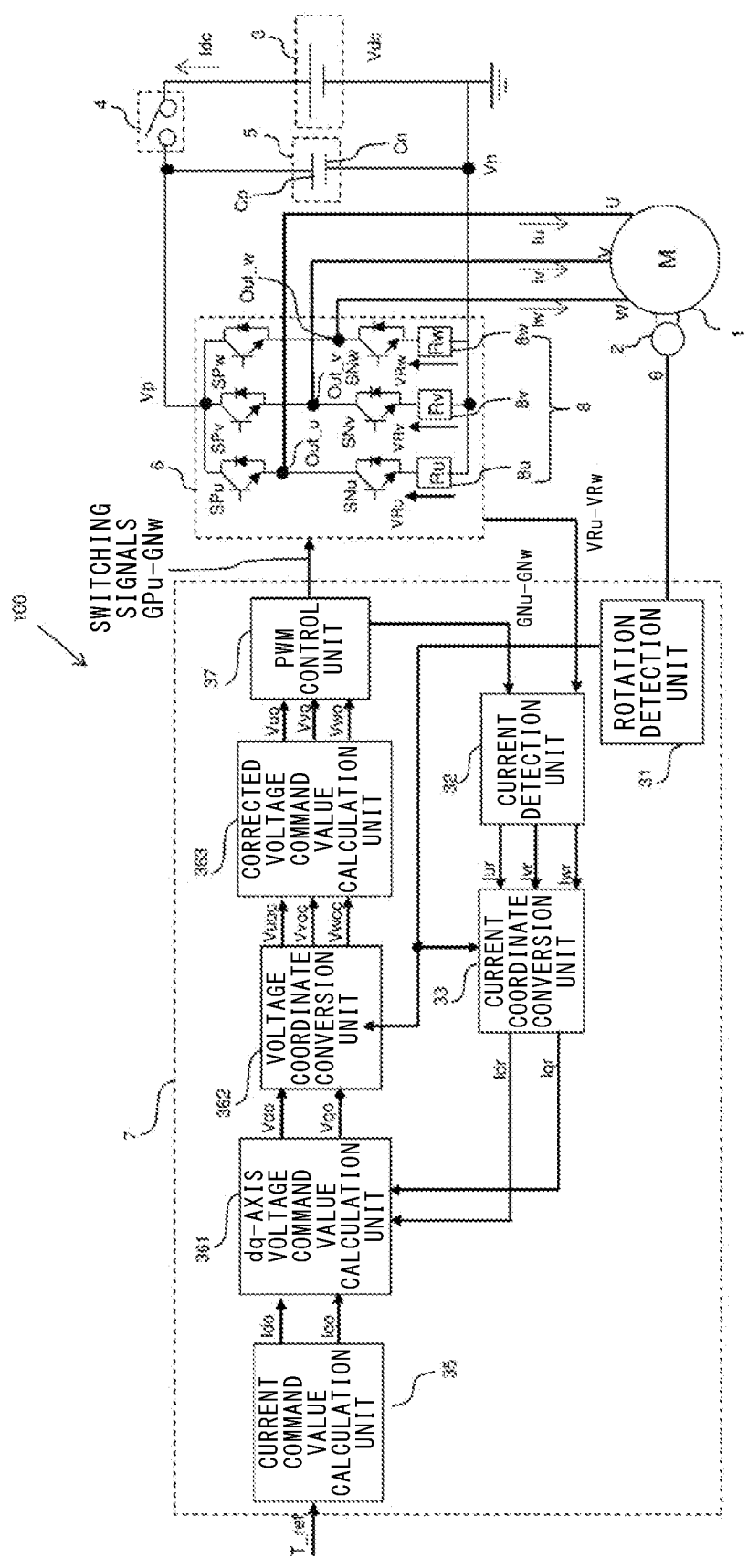
FIG. 1 is a configuration diagram of the entirety of a power conversion device according to embodiment 1.

Hereinafter, power conversion devices according to preferred embodiments of the present disclosure will be described with reference to the drawings. The same features and corresponding parts are denoted by the same reference characters, and detailed descriptions thereof will be omitted. In the subsequent embodiments as well, redundant descriptions of components denoted by the same reference characters will be omitted.

Embodiment 1

FIG. 1 is a configuration diagram of the entirety of a power conversion device 100 according to the present disclosure for supplying power to an AC rotating machine 1.

The AC rotating machine 1 includes a stator and a rotor disposed on a radially inner side relative to the stator. Windings Cu, Cv, and Cw for three phases which are a U phase, a V phase, and a W phase are wound on the stator. The rotor is provided with a permanent magnet, and the AC rotating machine 1 is configured as a permanent magnet type synchronous rotating machine. Alternatively, the AC rotating machine 1 may be: a field winding type synchronous rotating machine in which the rotor is provided with an electromagnet; or an induction machine in which the rotor is provided with no permanent magnet. The windings Cu, Cv, and Cw for the three phases are connected in star connection or delta connection.

The rotor includes a rotation detection circuit 2 for detecting a rotation angle of the rotor. As the rotation detection circuit 2, a resolver, an encoder, a magneto resistive (MR) sensor, or the like is used. An output signal from the rotation detection circuit 2 is inputted to a controller 7.

A DC power supply 3 outputs a power supply voltage Vdc to an inverter 6. The DC power supply 3 may be any device such as a battery, a DC-DC converter, a diode rectifier, or a PWM rectifier as long as the device outputs the power supply voltage Vdc. The DC power supply 3 may be provided with a voltage sensor for detecting the power supply voltage Vdc, and an output signal from the voltage sensor may be inputted to the controller 7. The controller 7 may perform control by using the detected power supply voltage Vdc.

A circuit breaker 4 has a function of performing disconnection between the DC power supply 3 and the inverter 6 and has a function of protecting the DC power supply 3 by performing disconnection when an abnormality occurs at a certain location in the power conversion device 100 composed of the inverter 6 and the controller 7. As the circuit breaker 4, an electromagnetic contactor, or a semiconductor switching element (a metal oxide semiconductor field effect transistor (MOSFET), an insulated gate bipolar transistor (IGBT), a bipolar transistor, or a thyristor), may be used. The circuit breaker 4 has an electrical resistance Rdc.

A capacitor 5 is connected in parallel to the inverter 6 for the purpose of stabilizing the DC voltage Vdc to be inputted to the inverter 6. Therefore, the capacitor 5 is connected in parallel to the DC power supply 3 with the circuit breaker 4 interposed therebetween. The reason why the capacitor 5 is connected so as to be closer to the inverter 6 than the circuit breaker 4 is because, by doing so, a fluctuation amount of a voltage drop expressed as a product of the electrical resistance Rdc and an output current Idc from the DC power supply 3 is canceled out considering the fact that the purpose of interposing the capacitor 5 is to stabilize the voltage to be inputted to the inverter 6. The capacitor 5 has a positive-electrode-side terminal Cp and a negative-electrode-side terminal Cn.

Three sets of series circuits (legs) are provided to the inverter 6 so as to correspond to three respective phases. In each series circuit (leg), a switching element SP on a positive electrode side (hereinafter, referred to as an upper arm) connected to the positive-electrode-side terminal Cp (substantially synonymous with a positive-electrode-side input terminal of the inverter 6) of the capacitor 5, and a switching element SN on a negative electrode side (hereinafter, referred to as a lower arm) connected to the negative-electrode-side terminal Cn (substantially synonymous with a negative-electrode-side input terminal of the inverter 6) of the capacitor 5, are connected in series. Further, a connection point between the two switching elements in the series circuit for each phase is connected to the winding for the corresponding phase.

Specifically, the series circuit for a U phase has an upper-arm switching element SPu for the U phase and a lower-arm switching element SNu for the U phase which are connected in series, and the connection point between the two switching elements is connected to the winding Cu for the U phase. The series circuit for a V phase has an upper-arm switching element SPv for the V phase and a lower-arm switching element SNv for the V phase which are connected in series, and the connection point between the two switching elements is connected to the winding Cv for the V phase. The series circuit for a W phase has an upper-arm switching element SPw for the W phase and a lower-arm switching element SNw for the W phase which are connected in series, and the connection point between the two switching elements is connected to the winding Cw for the W phase.

As each switching element, an IGBT to which a diode is connected in antiparallel, an MOSFET, a bipolar transistor to which a diode is connected in antiparallel, or the like is used. Gate terminals of the respective switching elements SPu to SNw are connected to the controller 7 via a gate drive circuit or the like. The switching elements SPu to SNw are turned on or off according to respective switching signals GPu to GNw outputted from the controller 7.

A current detection circuit 8 is configured to detect currents flowing through the lower-arm switching elements SNu, SNv, and SNw for the three phases. The current detection circuit 8 has shunt resistors $8u$, $8v$, and $8w$ connected in series to the lower-arm switching elements SNu, SNv, and SNw for the respective phases. That is, the shunt resistor $8u$ for the U phase is connected in series to the negative electrode side of the lower-arm switching element SNu for the U phase, the shunt resistor $8v$ for the V phase is connected in series to the negative electrode side of the lower-arm switching element SNv for the V phase, and the shunt resistor $8w$ for the W phase is connected in series to the negative electrode side of the lower-arm switching element SNw for the W phase. Potential differences VRu, VRv, and VRw between both ends of the shunt resistors $8u$, $8v$, and $8w$ for the respective phases are inputted to the controller 7.

Although the current detection circuit 8 is configured to detect currents flowing through the lower-arm switching elements SNu, SNv, and SNw for the three phases in the present embodiment, the current detection circuit 8 may be configured to detect currents flowing through the lower-arm switching elements for two of the phases. In this case, the controller 7 may calculate a current for the remaining one phase on the basis of the current detection values for the two phases, taking advantage of the fact that the total value of winding currents for the three phases is zero. For example, the current detection circuit 8 may detect currents Iur and Ivr for the U phase and the V phase, and the controller 7 may calculate a current Iwr for the W phase according to an expression Iwr=−Iur−Ivr.

Figure 2:
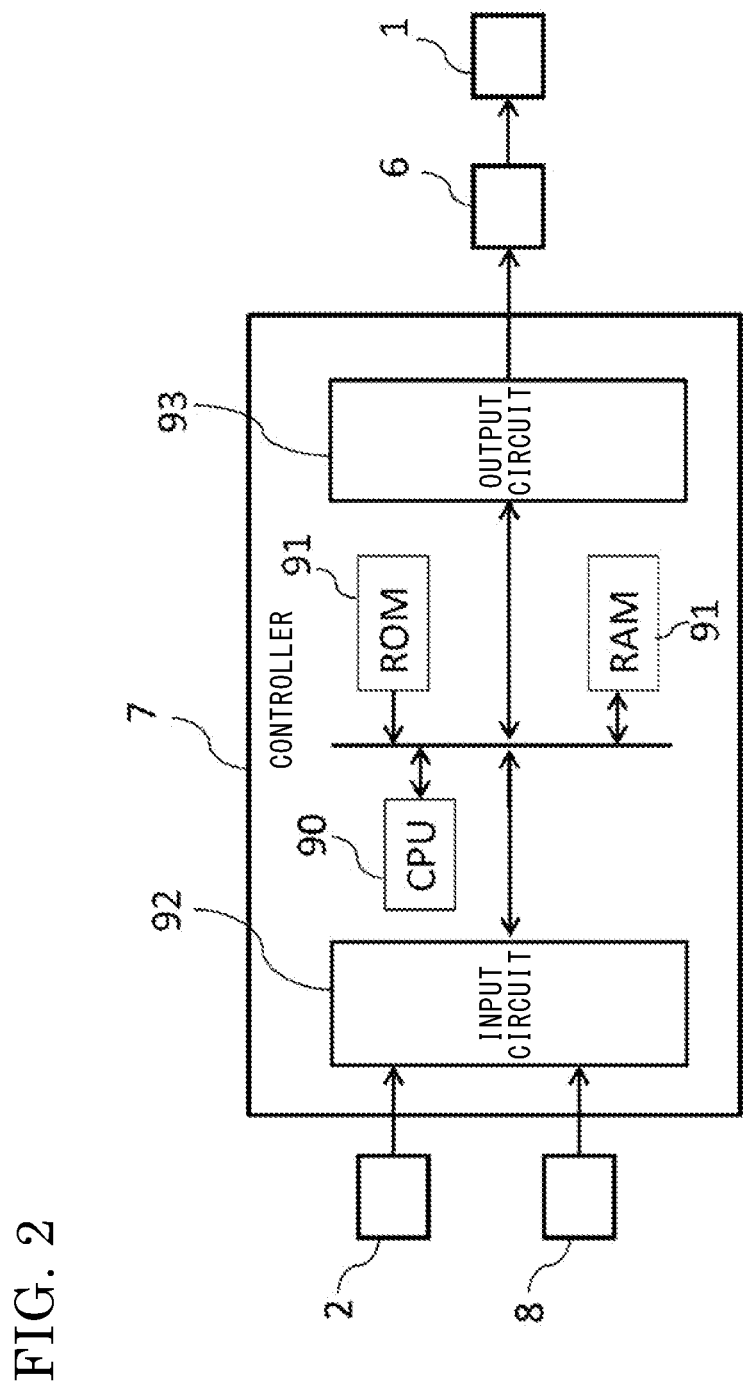
FIG. 2 is a diagram explaining a hardware configuration of a controller in embodiment 1.

The controller 7 controls the AC rotating machine 1 via the inverter 6. As shown in FIG. 1, the controller 7 includes a rotation detection unit 31, a current detection unit 32, a current coordinate conversion unit 33, a current command value calculation unit 35, a dq-axis voltage command value calculation unit 361, a voltage coordinate conversion unit 362, a corrected voltage command value calculation unit 363, a PWM control unit 37, and the like. The functions of the controller 7 are implemented by processing circuits included in the controller 7. Specifically, as shown in FIG. 2, the controller 7 includes, as the processing circuits, a computation processing device 90 (computer) such as a central processing unit (CPU), storage devices 91 through which data is transmitted to or received from the computation processing device 90, an input circuit 92 which inputs an external signal to the computation processing device 90, an output circuit 93 which outputs a signal from the computation processing device 90 to outside, and the like.

As the computation processing device 90, an application specific integrated circuit (ASIC), an integrated circuit (IC), a digital signal processor (DSP), a field programmable gate array (FPGA), any type of logical circuit, any type of signal processing circuit, or the like may be included. Alternatively, a plurality of the computation processing devices 90 of the same type or different types may be included so as to execute each process in a shared manner. As the storage devices 91, a random access memory (RAM) configured to enable data to be read and written from the computation processing device 90, a read only memory (ROM) configured to enable data to be read from the computation processing device 90, and the like are included. Various types of sensors such as the rotation detection circuit 2 and the current detection circuit 8, and switches, are connected to the input circuit 92. The input circuit 92 includes an A/D converter or the like for inputting output signals from these sensors and switches to the computation processing device 90. Electric loads such as a gate drive circuit that performs ON or OFF drive on each switching element are connected to the output circuit 93. The output circuit 93 includes a drive circuit or the like that outputs a control signal from the computation processing device 90 to each of these electric loads.

The functions, in FIG. 1, included in the controller 7 are implemented through: execution, by the computation processing device 90, of software (program) stored in the storage devices 91 such as the ROM; and cooperation with other pieces of hardware, of the controller 7, such as the storage devices 91, the input circuit 92, and the output circuit 93. It is noted that setting data such as gains and threshold values to be used by the rotation detection unit 31, the current detection unit 32, the current coordinate conversion unit 33, the current command value calculation unit 35, the dq-axis voltage command value calculation unit 361, the voltage coordinate conversion unit 362, the corrected voltage command value calculation unit 363, the PWM control unit 37, and the like are stored in the storage devices 91 such as the ROM as parts of software (program). Hereinafter, each function of the controller 7 will be described in detail.

The rotation detection unit 31 detects a magnetic pole position (a rotation angle of the rotor) e of the rotor on the basis of the output signal from the rotation detection circuit 2. The magnetic pole position of the rotor is set to be in the direction of an N pole of the permanent magnet provided in the rotor. Alternatively, the rotation detection unit 31 may be configured to, without using any rotation sensor, estimate a rotation angle (magnetic pole position) on the basis of, for example, current information obtained by superimposing a harmonic component on a current command value (may be of a so-called sensorless type).

The current detection unit 32 detects the currents Iur, Ivr, and Iwr flowing through the windings for the three phases, on the basis of output signals from the current detection circuit 8. Specifically, the currents Iur, Ivr, and Iwr in the windings for the respective phases are detected by dividing the potential differences VRu, VRv, and VRw between both ends of the shunt resistors $8u$, $8v$, and $8w$ for the respective phases by the resistance values of the shunt resistors $8u$, $8v$, and $8w$, respectively.

The current detection circuit 8 detects currents flowing through the lower-arm switching elements SNu, SNv, and SNw, and thus the current detection unit 32 detects the currents at timings at which the lower-arm switching elements are turned on. In addition, the PWM control unit 37 described later turns on the lower-arm switching elements SNu, SNv, and SNw per carrier cycle Tc. Therefore, the current detection unit 32 detects, on the basis of the output signals from the current detection circuit 8, the currents Iur, Ivr, and Iwr in the windings for the three phases at a current detection cycle TIdt (=A×Tc) obtained by multiplying, by a first natural number A, the carrier wave cycle Tc at which the lower-arm switching elements SNu, SNv, and SNw are turned on. In the present embodiment, the current detection circuit 8 detects the currents at a timing of each current detection cycle TIdt at which a carrier wave CA reaches a crest thereof.

The current coordinate conversion unit 33 converts, at every time of current detection, the current detection values Iur, Ivr, and Iwr in the windings for the three phases into a current detection value Idr on a d-axis and a current detection value Iqr on a q-axis on a coordinate system formed by the d-axis and the q-axis. The coordinate system formed by the d-axis and the q-axis is a biaxial rotating coordinate system that is rotated in synchronization with the magnetic pole position of the rotor. The d-axis is set to be in the direction of the magnetic pole position θ (N pole), and the q-axis is set to be in a direction that is advanced from the d-axis by 90° in terms of electrical angle. Specifically, the current coordinate conversion unit 33 performs three-phase/two-phase conversion and rotational coordinate conversion on the current detection values Iur, Ivr, and Iwr for the three phases on the basis of the magnetic pole position θ, to perform conversion into the current detection value Idr on the d-axis and the current detection value Iqr on the q-axis.

The current command value calculation unit 35 calculates current command values Ido and Iqo on the d-axis and the q-axis on the basis of a torque command value T_ref, the power supply voltage Vdc, a rotational angular velocity ω, and the like. The current command values Ido and Iqo on the d-axis and the q-axis are calculated according to current vector control methods such as maximum torque control, maximum torque voltage control, magnetic flux-weakening control, and Id=0 control. For example, in the case of performing Id=0 control, the current command value Ido on the d-axis is set to zero (Ido=0), and the current command value Iqo on the q-axis is set to a value obtained by multiplying the torque command value T_ref by a conversion coefficient. The torque command value T_ref may be calculated in the controller 7 or may be transmitted from an external control device.

The dq-axis voltage command value calculation unit 361 performs current feedback control of changing a voltage command value Vdo on the d-axis and a voltage command value Vqo on the q-axis through proportional-integral (PI) control or the like such that: the current detection value Idr on the d-axis approaches the current command value Ido on the d-axis; and the current detection value Iqr on the q-axis approaches the current command value Iqo on the q-axis. It is noted that feedforward control for preventing interference between d-axis current and q-axis current may be performed.

The voltage coordinate conversion unit 362 performs fixed coordinate conversion and two-phase/three-phase conversion on the voltage command values Vdo and Vqo on the d-axis and the q-axis on the basis of the magnetic pole position θ, to perform conversion into post-coordinate-conversion voltage command values Vuoc, Vvoc, and Vwoc the three phases. The post-coordinate-conversion voltage command values Vuoc, Vvoc, and Vwoc for the three phases are sine waves.

The corrected voltage command value calculation unit 363 performs, on the post-coordinate-conversion voltage command values Vuoc, Vvoc, and Vwoc for the three phases which are sine waves, amplitude reduction modulation for reducing the amplitudes of the voltage command values for the three phases while maintaining line-to-line voltages. Consequently, corrected voltage command values Vuo, Vvo, and Vwo which are final voltage command values for the three phases are calculated.

Specifically, as indicated in expression (1-1), the corrected voltage command value calculation unit 363 may: determine a minimum value Vmin and a maximum value Vmax among the post-coordinate-conversion voltage command values Vuoc, Vvoc, and Vwoc for the three phases; multiply a sum of the minimum value Vmin and the maximum value Vmax by 0.5, thereby calculating an offset voltage Voff; and subtract the offset voltage Voff from the post-coordinate-conversion voltage command values Vuoc, Vvoc, and Vwoc for the three phases, thereby calculating the voltage command values Vuo, Vvo, and Vwo for the three phases.

$$V\text{min}=\text{MIN}(V\text{uoc},V\text{voc},V\text{woc})$$

$$V\text{max}=\text{MAX}(V\text{uoc},V\text{voc},V\text{woc})$$

$$V\text{off}=0.5\times(V\text{min}+V\text{max})$$

$$V\text{uo}=V\text{uoc}-V\text{off}$$

$$V\text{vo}=V\text{voc}-V\text{off}$$

$$V\text{wo}=V\text{woc}-V\text{off} \quad \text{expression (1-1)}$$

Figure 3:
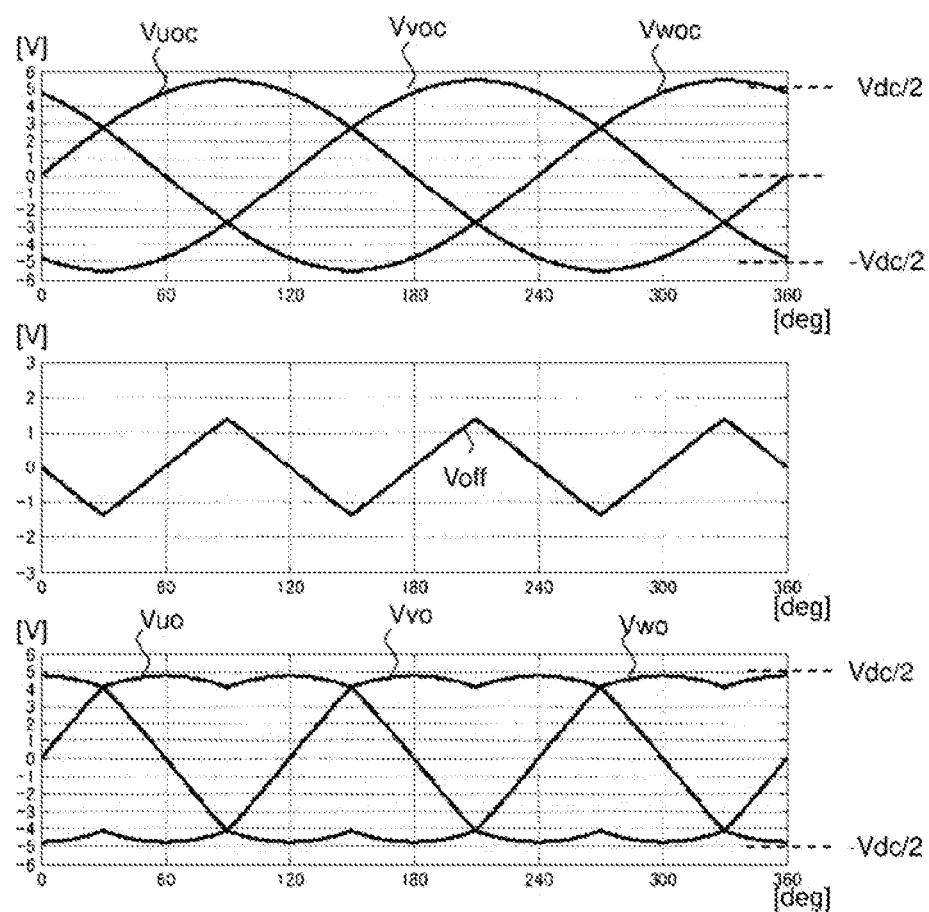
FIG. 3 is a diagram explaining the manner of amplitude reduction modulation performed through calculation by a corrected voltage command value calculation unit, in embodiment 1.

The manner of amplitude reduction modulation in expression (1-1) is shown in FIG. 3. The post-coordinate-conversion voltage command values Vuoc, Vvoc, and Vwoc for the three phases are shown in a graph in an upper row. The post-coordinate-conversion voltage command values Vuoc, Vvoc, and Vwoc for the three phases are outside a range from −Vdc/2 to +Vdc/2, and voltage saturation has occurred. Meanwhile, post-amplitude-reduction-modulation voltage command values Vuo, Vvo, and Vwo for the three phases in a graph in a lower row are within the range from −Vdc/2 to +Vdc/2, and occurrence of voltage saturation has been prevented.

In FIG. 3, with a focus on the waveform of the offset voltage Voff in a graph in an intermediate row, the offset voltage Voff is a third-order harmonic component fluctuating at a frequency that is three times the frequencies of fundamental waves of the voltage command values Vuoc to Vwoc. In this manner, the offset voltage Voff is adapted to become a third-order harmonic component fluctuating at a frequency that is three times the frequencies of the voltage command values Vuoc, Vvoc, and Vwoc.

The PWM control unit 37 compares each of the voltage command values Vuo, Vvo, and Vwo for the three phases and the carrier wave CA vibrating at the carrier cycle Tc with each other, to perform ON/OFF control on the corresponding switching elements. The carrier wave CA is set to be a triangular wave vibrating at the carrier cycle Tc with an amplitude of Vdc/2 which is a value half the power supply voltage, with 0 being the center of the triangular wave.

Figure 4:
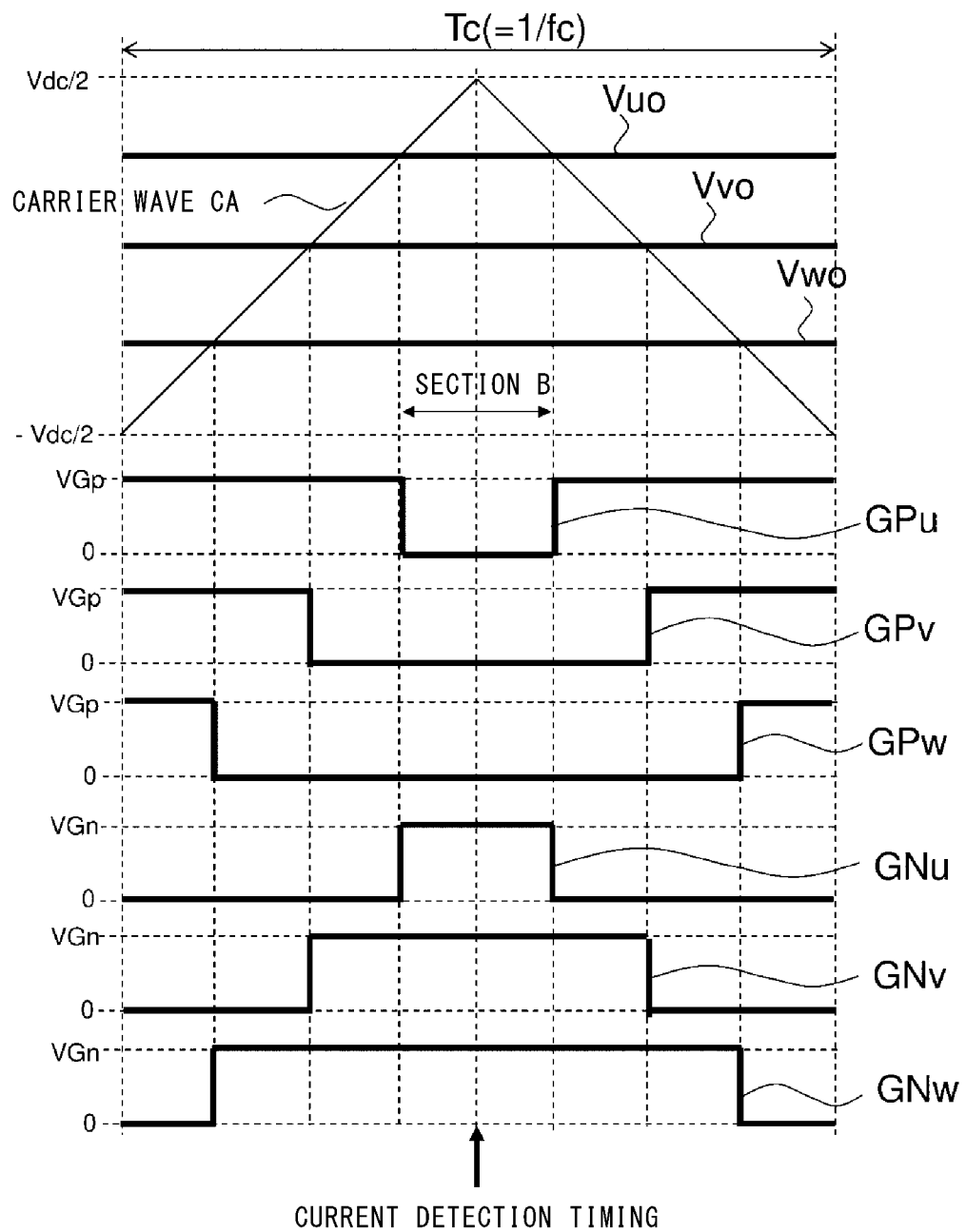
FIG. 4 is a diagram explaining an operation of a PWM control unit in embodiment 1.

As shown in FIG. 4, for each phase, the PWM control unit 37 sets a corresponding one of switching signals GPu, GPv, and GPw for the upper-arm switching elements SPu, SPv, and SPw to be ON (to have a voltage of VGp in FIG. 4) when the carrier wave CA has a value smaller than a corresponding one of the voltage command values Vuo, Vvo, and Vwo, and sets the corresponding one of the switching signals GPu, GPv, and GPw for the upper-arm switching elements SPu, SPv, and SPw to be OFF (to have a voltage of 0 in FIG. 4) when the carrier wave CA has a value larger than the corresponding one of the voltage command values Vuo, Vvo, and Vwo.

Meanwhile, for each phase, the PWM control unit 37 sets a corresponding one of switching signals GNu, GNv, and GNw for the lower-arm switching elements SNu, SNv, and SNw to be OFF (to have a voltage of 0 in FIG. 4) when the carrier wave CA has a value smaller than the corresponding one of the voltage command values Vuo, Vvo, and Vwo, and sets the corresponding one of the switching signals GNu, GNv, and GNw for the lower-arm switching elements to be ON (to have a voltage of VGn in FIG. 4) when the carrier wave CA has a value larger than the corresponding one of the voltage command values Vuo, Vvo, and Vwo. It is noted that, in each phase, a short-circuit prevention period (dead time) during which both the corresponding one of the upper-arm switching elements SPu, SPv, and SPw and the corresponding one of the lower-arm switching elements SNu, SNv, and SNw are turned off may be provided between an ON period of the upper-arm switching element and an ON period of the lower-arm switching element.

The switching signals described here are signals for controlling the switching elements. In the case of IGBTs, the switching signals are potential signals regarding gates G with the potentials of emitters E being reference potentials. In the case of MOSFETs, the switching signals are potential signals regarding gates G with the potentials of sources S being reference potentials. Here, both the ON potentials VGp of the switching signals GPu, GPv, and GPw for the upper-arm switching elements SPu, SPv, and SPw and the ON potentials VGn of the switching signals GNu, GNv, and GNw for the lower-arm switching elements SNu, SNv, and SNw are set to values necessary for turning on the switching elements, and both ON potentials are set to be in a relationship of "VGn>VGp". The reason for this setting will be described later.

As shown in FIG. 4, the switching signals GNu, GNv, and GNw for the lower arms for all the three phases are ON in a section B having a center at the crest of the carrier wave CA. Thus, in the section B, the current detection circuit 8 can detect currents flowing through the windings for the three phases. In the present embodiment, the current detection unit 32 is configured to detect currents at a timing of arrival at the crest of the carrier wave CA as described above.

Next, an advantage of satisfying "VGn>VGp" (described above) in the case of connecting the shunt resistors 8$u$, 8$v$, and 8$w$ between the lower-arm switching elements SNu, SNv, and SNw and the negative-electrode-side input terminal of the inverter 6, will be described in detail.

Figure 5:
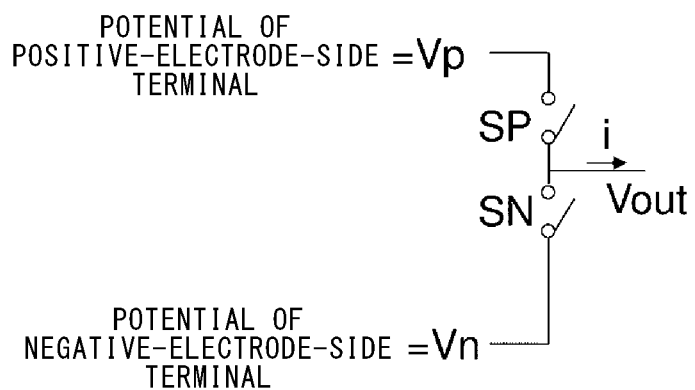
FIG. 5 is a diagram explaining an equivalent circuit, for one phase, of a three-phase inverter.

FIG. 5 shows an equivalent circuit, for one phase, of the inverter 6. The potential of the positive-electrode-side input terminal is defined as Vp, and the potential of the negative-electrode-side input terminal is defined as Vn. For the DC voltage Vdc, Vp−Vn=Vdc is satisfied. A conduction resistance of each lower-arm switching element SN is defined as Rn, and a conduction resistance of each upper-arm switching element SP is defined as Rp.

An output terminal is connected at an intermediate portion between each upper-arm switching element SP and the corresponding lower-arm switching element SN, and the potential of the output terminal is defined as an output terminal potential Vout.

Here, if the ratio of an ON period of the upper-arm switching element SP to the cycle Tc of the PWM carrier wave (duty ratio) is defined as D, the output terminal potential Vout is expressed with the following expression.

$$Vout = D \times (Vp - Rp \times i) + (1-D) \times (Vn - Rn \times i) \quad \text{expression (1-2)}$$

Here, if Vn=0 and Vp=Vdc are satisfied, expression (1-2) becomes the following expression.

$$Vout = D \times Vdc + D \times (Rn - Rp) \times i - Rn \times i \quad \text{expression (1-3)}$$

With the same manner of deliberation, if the ratios of ON periods of the upper-arm switching elements SPu and SPv to the cycle Tc of the PWM carrier wave are defined as Du and Dv, a U-phase terminal voltage Vout_u and a V-phase terminal voltage Vout_v are expressed with the following expressions.

$$Vout\_u = Du \times Vdc + (1-Du) \times (Rn-Rp) \times iu - Rn \times iu \quad \text{expression (1-4)}$$

$$Vout\_v = Dv \times Vdc + (1-Dv) \times (Rn-Rp) \times iv - Rn \times iv \quad \text{expression (1-5)}$$

Here, in the case of superimposing the offset voltage Voff, if the amount of fluctuation, caused by superimposition of the offset voltage Voff, in each of the ratios of the ON periods of the upper-arm switching elements SPu and SPv to the cycle Tc of the PWM carrier wave is defined as ΔD, the following expressions are satisfied.

$$Vout\_u = (Du+\Delta D) \times Vdc + (1-(Du+\Delta D)) \times (Rn-Rp) \times iu - Rn \times iu \quad \text{expression (1-6)}$$

$$Vout\_v = (Dv+\Delta D) \times Vdc + (1-(Dv+\Delta D)) \times (Rn-Rp) \times iv - Rn \times iv \quad \text{expression (1-7)}$$

Here, if the conduction resistance Rn and the conduction resistance Rp are set to be equal to each other (Rn=Rp), an interphase voltage Vout_uv between the U phase and the V phase is expressed as follows.

$$Vout\_uv = Vout\_u - Vout\_v = (Du-Dv) \times Vdc - Rn \times (iu-iv) \quad \text{expression (1-8)}$$

The interphase voltage Vout_uv does not include the fluctuation amount ΔD, and thus influence of superimposition of the offset voltage Voff is not inflicted on the interphase voltage. Therefore, since current flows through the AC rotating machine 1 on the basis of the interphase voltage, influence of superimposition of the offset voltage Voff is not observed in the current flowing through the AC rotating machine 1.

Considering the above conditions, it is favorable that the conduction resistance Rn between the output terminal and the negative-electrode-side input terminal of the inverter, and the conduction resistance Rp between the output terminal and the positive-electrode-side input terminal of the inverter, are set to be equal to each other as shown in FIG. 5.

In general, a conduction resistance is dependent on an ON potential of a switching signal inputted to a switching element, and a higher ON potential tends to result in a lower conduction resistance. Therefore, in the case where the efficiency of the inverter is desired to be increased, the ON potential is increased so that the conduction resistance is reduced.

In the present embodiment, setting of the conduction resistances Rp and Rn to be equal to each other is favorable in terms of reducing influence, on the interphase voltage, of superimposition of the offset voltage Voff. Considering this, the ON potentials VGp and VGn of the switching signals to be inputted to the upper-arm switching element SP and the lower-arm switching element SN are set to be equal to each other, whereby the conduction resistances Rp and Rn become equal to each other as a result.

Figure 6:
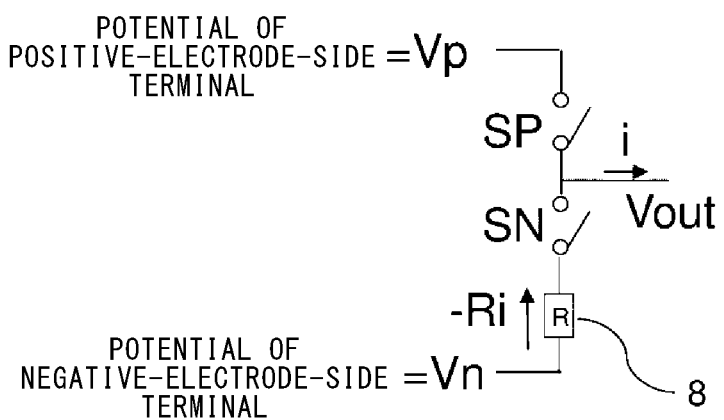
FIG. 6 is a diagram explaining a circuit obtained by adding a current detection circuit in embodiment 1 to the equivalent circuit, for the one phase, of the three-phase inverter.

Next, a case where the current detection circuit 8 having a resistance R and connected in series to the lower-arm switching element SN is added to the configuration in FIG. 5, will be contemplated with reference to FIG. 6 (a circuit in this case may be considered as an equivalent circuit, for one phase, of the inverter 6 in FIG. 1). In this case, a similar contemplation can be made by replacing the conduction resistance Rn between the output terminal and the negative-electrode-side input terminal of the inverter in FIG. 5, with Rn+R in FIG. 6.

For FIG. 6, regarding the U-phase terminal voltage Vout_u and the V-phase terminal voltage Vout_v after superimposition of the offset voltage Voff, the conduction resistance Rn in each of expression (1-6) and expression (1-7)

only has to be replaced with Rn+R. Thus expression (1-6) and expression (1-7) become the following expressions.

$$Vout\_u = (Du+\Delta D) \times Vdc + (1-(Du+\Delta D)) \times (Rn+R-Rp) \times iu - (Rn+R) \times iu \quad \text{expression (1-9)}$$

$$Vout\_v = (Dv+\Delta D) \times Vdc + (1-(Dv+\Delta D)) \times (Rn+R-Rp) \times iv - (Rn+R) \times iv \quad \text{expression (1-10)}$$

Here, if the conduction resistances Rn and Rp are assumed to be equal to each other as described above, the interphase voltage Vout_uv between the U phase and the V phase is expressed as follows.

$$Vout\_uv = Vout\_u - Vout\_v = (Du-Dv) \times Vdc - \Delta D \times R \times (iu-iv) - (Rn+R) \times (iu-iv) \quad \text{expression (1-11)}$$

As is obvious from expression (1-11), the interphase voltage Vout_uv includes the fluctuation amount $\Delta D$. Therefore, influence of superimposition of the offset voltage Voff is observed in the interphase voltage Vout_uv. This is because, since a third-order harmonic is superimposed as the offset voltage Voff as shown in FIG. 3, the third-order harmonic is superimposed on the interphase voltage, and a third-order torque ripple is generated in the torque of the AC rotating machine 1 as a result.

Figure 7:
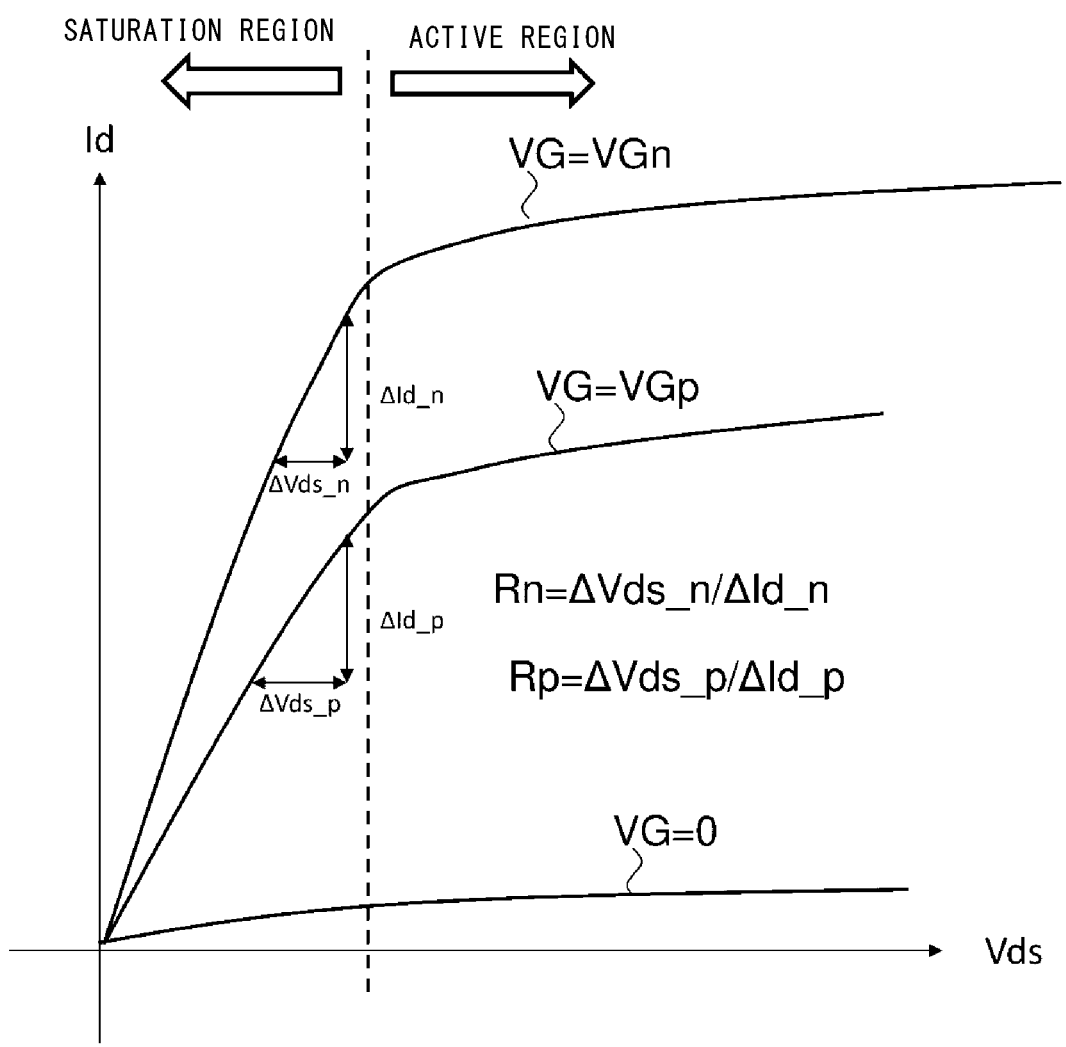
FIG. 7 is a diagram explaining the relationship between an ON potential of a switching signal for an upper-arm switching element and an ON potential of a switching signal for a lower-arm switching element, in embodiment 1.

Considering this, in the present embodiment, the relationship between the ON potential VGp of a switching signal GP for each upper-arm switching element and the ON potential VGn of a switching signal GN for the corresponding lower-arm switching element is set to satisfy "VGn>VGp" as described above. That is, a relationship such as one shown in the graph in FIG. 7 is obtained. A characteristic in the case where the ON potential VG is VGn, a characteristic in the case where the ON potential VG is VGp, and a characteristic in the case where the ON potential VG is 0, are shown in FIG. 7 in which VGn>VGp>0 is satisfied. In FIG. 7, the horizontal axis indicates drain-source voltage Vds, and the vertical axis indicates drain current Id.

In FIG. 7, in a saturation region, a gentler slope in the graph indicates a higher conduction resistance. That is, as shown in FIG. 7, the conduction resistances Rn and Rp are respectively expressed as follows.

$$Rn = \Delta Vds\_n/\Delta Id\_n \quad \text{expression (1-12)}$$

$$Rp = \Delta Vds\_p/\Delta Id\_p \quad \text{expression (1-13)}$$

As a result, the conduction resistance Rp between the output terminal and the positive-electrode-side input terminal of the inverter becomes higher than the conduction resistance Rn between the output terminal and the negative-electrode-side input terminal of the inverter. More ideally, the ON potential VGp of the switching signal GP for the upper-arm switching element and the ON potential VGn of the switching signal GN for the lower-arm switching element are set so as to satisfy Rp=Rn+R. Consequently, expressions (1-9) and (1-10) respectively become the following expressions.

$$Vout\_u = (Du+\Delta D) \times Vdc - (Rn+R) \times iu \quad \text{expression (1-14)}$$

$$Vout\_v = (Dv+\Delta D) \times Vdc - (Rn+R) \times iv \quad \text{expression (1-15)}$$

The second term on the right-hand side can be eliminated as compared to expression (1-9) and expression (1-10). As a result, the interphase voltage Vout_uv is expressed as follows.

$$Vout\_uv = Vout\_u - Vout\_v = (Du-Dv) \times Vdc - (Rn+R) \times (iu-iv) \quad \text{expression (1-16)}$$

As indicated by this, the interphase voltage does not include the fluctuation amount $\Delta D$, and thus influence of superimposition of the offset voltage Voff is not inflicted on the interphase voltage. Since current flows through the AC rotating machine 1 on the basis of the interphase voltage, influence of superimposition of the offset voltage Voff is not observed in the current flowing through the AC rotating machine 1.

Considering the above conditions, the inverter such as one shown in FIG. 6 is ideally configured as follows. That is, the conduction resistance Rn between the output terminal and the negative-electrode-side input terminal of the inverter and the conduction resistance Rp between the output terminal and the positive-electrode-side input terminal of the inverter are preferably set to satisfy "Rp=Rn+R". However, practically, there is also a case where this relationship is not satisfied, considering the facts that: the ON potential VG of each switching signal slightly fluctuates; and Rp and Rn vary according to heat characteristics of the switching elements. In this case, setting is performed so as to satisfy "Rp>Rn". Specifically, the conduction resistance Rp between the output terminal and the positive-electrode-side input terminal of the inverter is set to be higher than a conduction resistance Rn obtained by excluding the current detection resistance R from the conduction resistance between the output terminal and the negative-electrode-side input terminal of the inverter. Consequently, even if a third-order harmonic voltage is superimposed as the offset voltage Voff, influence to be inflicted in a third order of the interphase voltage can be reduced. As a result, an advantageous effect of suppressing a third-order torque ripple in the AC rotating machine 1 is exhibited.

Therefore, the difference between the conduction resistance Rn between the output terminal and the negative-electrode-side input terminal of the inverter and the conduction resistance Rp between the output terminal and the positive-electrode-side input terminal of the inverter is corrected, whereby influence of a third-order harmonic caused by superimposition of the third-order harmonic component can be reduced.

It is noted that setting of the ON potentials described above may be performed with ON command signals (gate voltages in the case of MOSFETs or IGBTs, or base currents in the case of bipolar transistors) for the switching elements. Reduction in the values of the ON command signals leads to increase in the conduction resistances.

Although a lower arm three-shunt current detection type inverter has been described above, the present embodiment is applicable also to a busbar one-shunt current detection type inverter. The reason is as follows. In the busbar one-shunt current detection type inverter as well, the conduction resistance between the output terminal and the negative-electrode-side input terminal of the inverter is "Rn+R", and the conduction resistance between the output terminal and the positive-electrode-side input terminal of the inverter is Rp, and thus the conduction resistance between the output terminal and the negative-electrode-side input terminal of the inverter is high. Therefore, by performing setting so as to satisfy "Rp>Rn" in the same manner as in the present embodiment, even if a third-order harmonic voltage is superimposed as the offset voltage Voff, influence to be inflicted in a third order of the interphase voltage can be reduced. As a result, the advantageous effect of suppressing a third-order torque ripple in the AC rotating machine 1 is exhibited.

In the above descriptions, the relationship between the ON potential VGp of the switching signal GP for the upper arm and the ON potential VGn of the switching signal GN for the lower arm has been described as satisfying "VGn>VGp" so as to satisfy "Rp>Rn". Meanwhile, in the case where the current detection resistance R is connected between each lower-arm switching element and the negative-electrode-side input terminal, satisfaction of "Rp>Rn" leads to reduction in influence to be inflicted in a third order of the interphase voltage even if a third-order harmonic voltage is superimposed as the offset voltage Voff, and thus, even in a state of, for example, satisfying "VGn=VGp", an upper-arm switching element and a lower-arm switching element may be selected such that the conduction resistance of the upper-arm switching element is higher than the conduction resistance of the lower-arm switching element with the ON potentials of the respective switching signals being equal to each other, in order to satisfy "Rp>Rn".

In general, the performance of a switching element is determined according to the conduction resistance thereof. A lower conduction resistance leads to a higher efficiency of the inverter and thus is considered to be more favorable. However, since the conduction resistance of the upper-arm switching element is desired to be higher than the conduction resistance of the lower-arm switching element herein, a product of a lower grade (having a higher conduction resistance) than the lower-arm switching element may be intentionally used as the upper-arm switching element in order to satisfy "Rp>Rn". Consequently, even if a third-order harmonic voltage is superimposed as the offset voltage Voff, influence to be inflicted in a third order of the interphase voltage can be reduced. As a result, the advantageous effect of suppressing a third-order torque ripple in the AC rotating machine 1 is exhibited.

Specifics are as follows. The performance of a power switching element such as an MOSFET is dependent on the conduction resistance thereof, and a higher conduction resistance indicates a lower performance (lower cost). Therefore, use of a product having a high conduction resistance as the upper-arm switching element makes it possible to reduce cost for the power switching element, and furthermore, reduce influence of the third-order harmonic.

Figure 8:
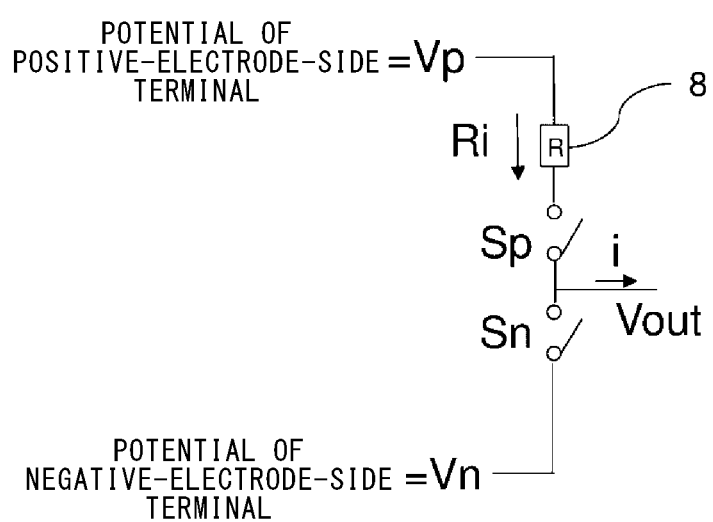
FIG. 8 is a diagram explaining another circuit obtained by adding the current detection circuit in embodiment 1 to the equivalent circuit, for the one phase, of the three-phase inverter.

A similar contemplation also applies to a case where the current detection circuit 8 is configured to be connected in series to the upper-arm switching elements SPu, SPv, and SPw for the three phases so as to detect currents flowing through the switching elements SPu, SPv, and SPw, in contrast to the configuration in FIG. 1. An equivalent circuit for one phase in this case is shown in FIG. 8. In this case, the relationship between the ON potential VGp of the switching signal GP for the upper arm and the ON potential VGn of the switching signal GN for the lower arm is set to satisfy "VGn<VGp" so as to ideally satisfy "Rn=Rp+R" or practically satisfy "Rp<Rn". Alternatively, switching elements may be selected such that the conduction resistance Rn of the lower-arm switching element is higher than the conduction resistance Rp of the upper-arm switching element in a state where the ON potentials are equal to each other. Specifically, the conduction resistance between the output terminal and the negative-electrode-side input terminal of the inverter is set to be higher than a conduction resistance obtained by excluding the current detection resistance from the conduction resistance between the output terminal and the positive-electrode-side input terminal of the inverter. Consequently, even if a third-order harmonic voltage is superimposed as the offset voltage Voff, influence to be inflicted in a third order of the interphase voltage can be reduced. As a result, the advantageous effect of suppressing a third-order torque ripple in the AC rotating machine 1 is exhibited.

Further, in a configuration in which the current detection resistance R is present between the lower-arm switching element and the negative-electrode-side input terminal, unbalance between the conduction resistance between the output terminal and the negative-electrode-side input terminal of the inverter and the conduction resistance between the output terminal and the positive-electrode-side input terminal of the inverter may be reduced by interposing at least one resistance R1 between the upper-arm switching element and the positive-electrode-side terminal Cp of the capacitor 5. Consequently, even if a third-order harmonic voltage is superimposed as the offset voltage Voff, influence to be inflicted in a third order of the interphase voltage can be reduced. As a result, the advantageous effect of suppressing a third-order torque ripple in the AC rotating machine 1 is exhibited.

Further, in a configuration in which the current detection resistance R is present between the upper-arm switching element and the positive-electrode-side input terminal, unbalance between the conduction resistance between the output terminal and the positive-electrode-side input terminal of the inverter and the conduction resistance between the output terminal and the negative-electrode-side input terminal of the inverter may be reduced by interposing at least one resistance R2 between the lower-arm switching element and the negative-electrode-side terminal Cn of the capacitor 5. This reduction may be performed to attain a configuration in which: even if a third-order harmonic voltage is superimposed as the offset voltage Voff, influence to be inflicted in a third order of the interphase voltage can be reduced; and, as a result, the advantageous effect of suppressing a third-order torque ripple in the AC rotating machine 1 is exhibited.

It is noted that the conduction resistance Rp mentioned in the present description may be considered to include a wire resistance from the positive-electrode-side input terminal for the upper-arm switching element to the positive-electrode-side terminal Cp of the capacitor 5 in addition to the conduction resistance of the upper-arm switching element. Meanwhile, the conduction resistance Rp does not include the resistance Rdc of the circuit breaker 4. Likewise, the conduction resistance Rn mentioned in the present description may be considered to include a wire resistance from the negative-electrode-side input terminal for the lower-arm switching element to the negative-electrode-side terminal Cn of the capacitor 5 in addition to the conduction resistance of the lower-arm switching element. Therefore, the "conduction resistance between the output terminal and the positive-electrode-side input terminal of the inverter" may be considered as a conduction resistance from the positive-electrode-side terminal Cp of the capacitor 5 to any of the output terminals (Out_u, Out_v, and Out_w), and the "conduction resistance between the output terminal and the negative-electrode-side input terminal of the inverter" may be considered as a conduction resistance from the negative-electrode-side terminal Cn of the capacitor 5 to any of the output terminals (Out_u, Out_v, and Out_w). In this case, if each wire resistance from the corresponding terminal of the capacitor to the corresponding switching element is sufficiently lower than the conduction resistance of the switching element, the wire resistance may be ignored, and consideration may be made with the conduction resistance of the upper-arm or lower-arm switching element.

Although the AC rotating machine 1 has been described as a load connected to the inverter 6 in the present embodiment, the load only has to be a load that can be regarded as a current source for the inverter 6. Therefore, the load only has to be any of three-phase inductive loads including the AC rotating machine.

Embodiment 2

A power conversion device according to embodiment 2 will be described with reference to FIG. 9. Embodiment 2 differs from embodiment 1 in terms of a corrected voltage command value calculation unit 363a.

As indicated in the following expression (2-1), the corrected voltage command value calculation unit 363a: determines a maximum value Vmax among the post-coordinate-conversion voltage command values Vuoc, Vvoc, and Vwoc for the three phases; subtracts the maximum value Vmax from Vdc/2, thereby calculating an offset voltage Voff; and subtracts the offset voltage Voff from the post-coordinate-conversion voltage command values Vuoc, Vvoc, and Vwoc for the three phases, thereby calculating corrected voltage command values Vuo, Vvo, and Vwo for the three phases.

$$V\text{max} = \text{MAX}(Vuoc, Vvoc, Vwoc)$$

$$V\text{off} = 0.5 \times Vdc - V\text{max}$$

$$Vuo = Vuoc - V\text{off}$$

$$Vvo = Vvoc - V\text{off}$$

$$Vwo = Vwoc - V\text{off} \qquad \text{expression (2-1)}$$

Figure 10:
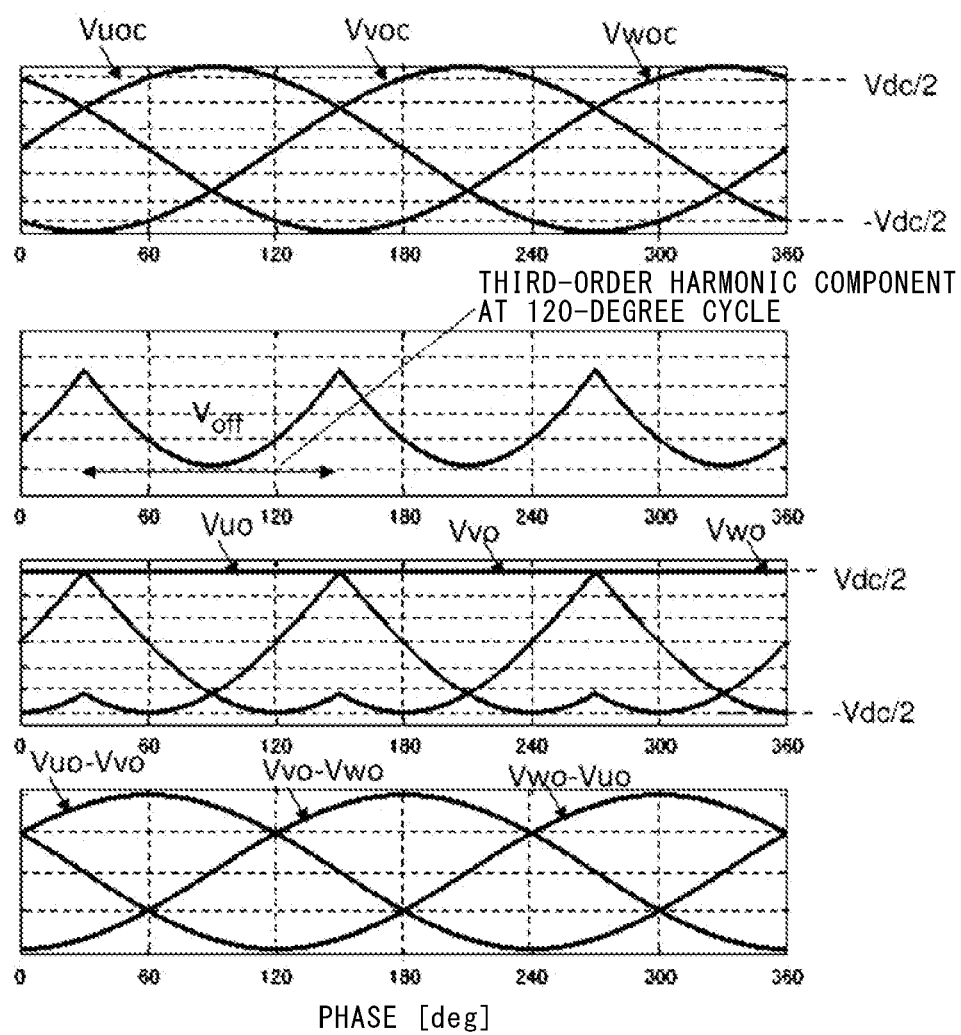
FIG. 10 is a diagram explaining the manner of amplitude reduction modulation performed through calculation by a corrected voltage command value calculation unit, in embodiment 2.

The waveforms of respective components in this case are shown in FIG. 10. FIG. 10 shows, in an upper row, the post-coordinate-conversion voltage command values Vuoc, Vvoc, and Vwoc for the three phases. FIG. 10 shows, in a second row from the upper row, the offset voltage Voff which is found to be a third-order harmonic component fluctuating at a frequency that is three times the frequencies of the voltage command values. FIG. 10 shows, in a third row from the upper row, the corrected voltage command values Vuo, Vvo, and Vwo for the three phases. Lastly, FIG. 10 shows, in a lowermost row, interphase voltage command values Vuo-Vvo, Vvo-Vwo, and Vwo-Vuo. It is found that any corrected voltage command value having the largest instantaneous value among the corrected voltage command values Vuo, Vvo, and Vwo for the three phases is equal to Vdc/2 which is an upper limit value capable of being outputted from the inverter.

The corrected voltage command values are obtained through calculation such as one performed with expression (2-1) in the inverter employing a lower arm three-shunt current detection type. That is, a modulation in which a third-order harmonic component (Voff) is calculated and the third-order harmonic component is added to calculate corrected voltage command values such that the largest one of the corrected voltage command values is equal to the upper limit value (Vdc/2) capable of being outputted from the inverter (hereinafter, referred to as an upper solid two-phase modulation), is performed.

An advantage of applying the upper solid two-phase modulation will be described with reference to FIG. 4. Vmax in expression (2-1) is constantly equal to Vdc/2 (synonymous with a situation in FIG. 10 in which any corrected voltage command value having the largest instantaneous value among the corrected voltage command values Vuo, Vvo, and Vwo for the three phases is equal to the upper limit value Vdc/2 capable of being outputted from the inverter), and no switching is performed during the cycle Tc of the carrier wave CA, in a phase with a corrected voltage command value equal to Vmax (GP is constantly ON and GN is constantly OFF). Therefore, there is an advantage that no switching in the phase at Vmax occurs within the section B while such switching is observed in another type of modulation. This advantage is also known from the fact that Vdc/2 is constantly obtained in any phase with a corrected voltage command value having the largest instantaneous value among the corrected voltage command values Vuo, Vvo, and Vwo in the upper row in FIG. 10. Occurrence of no switching within the section B means that no switching occurs around a timing of current detection, and thus the upper solid two-phase modulation can be said to be a modulation method that is excellent in the accuracy of current detection.

Figure 9:
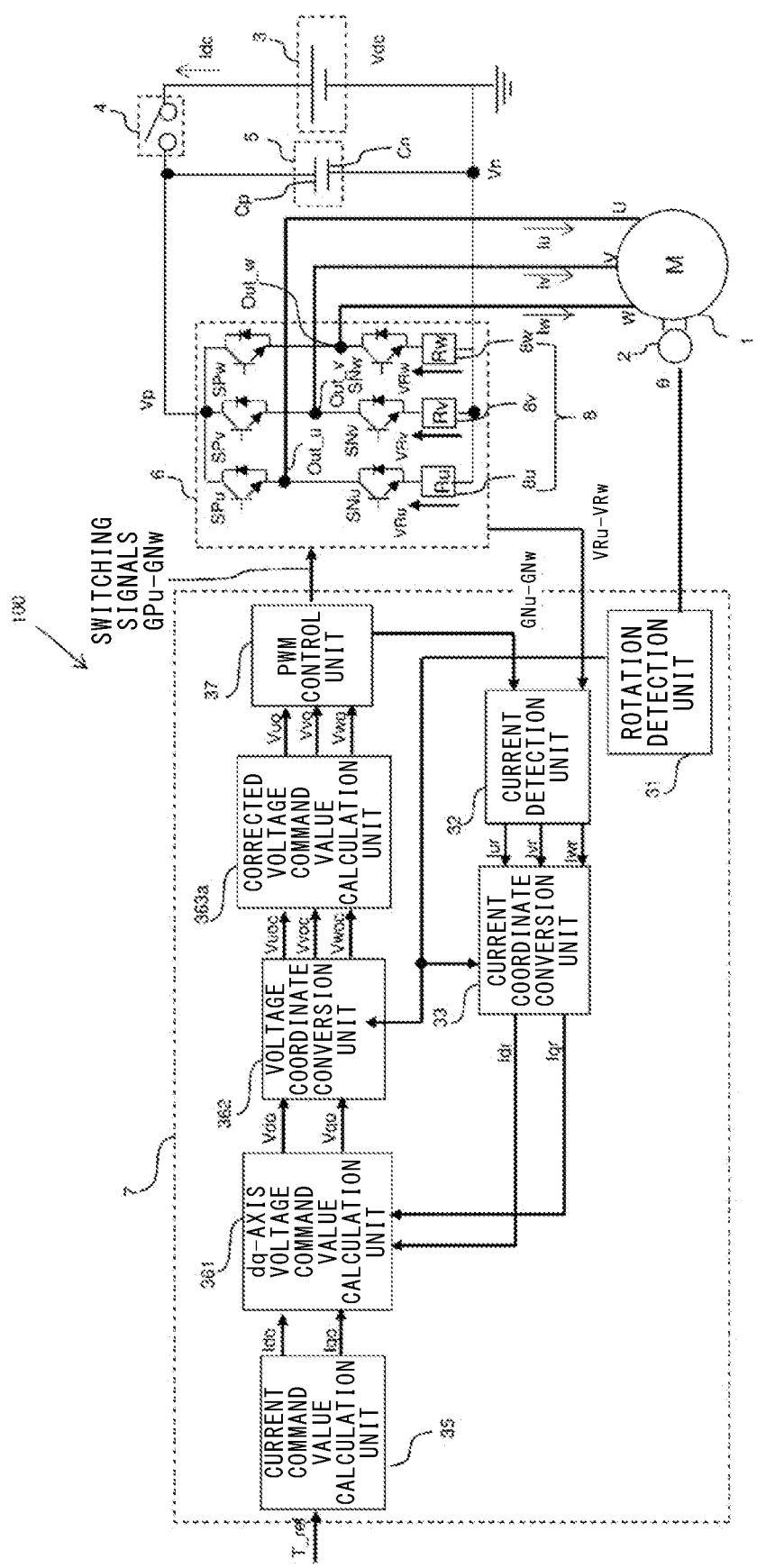
FIG. 9 is a configuration diagram of the entirety of a power conversion device according to embodiment 2.
Figure 11A:
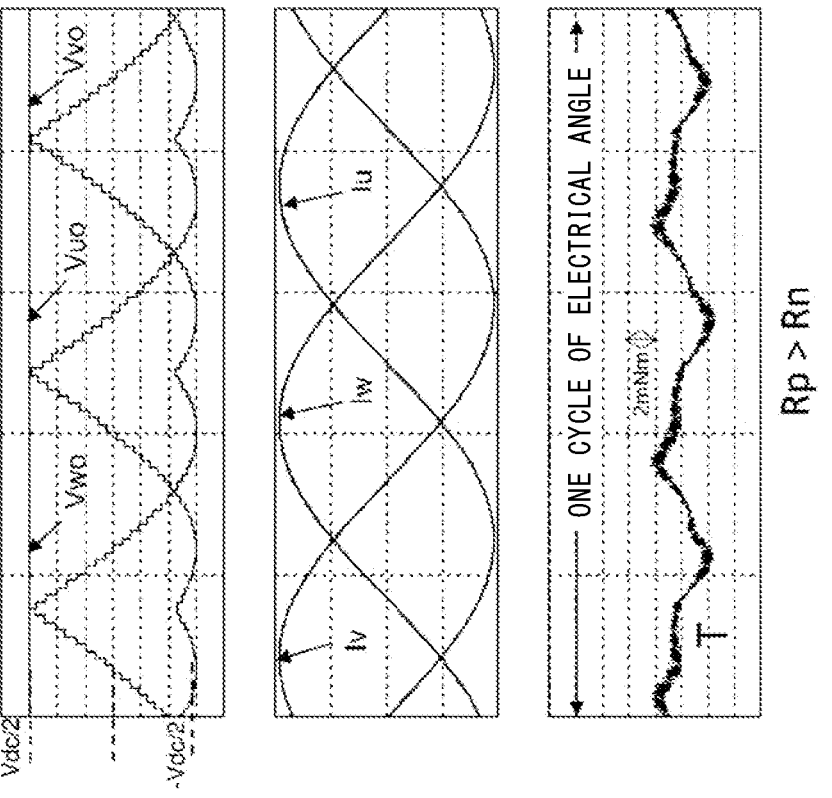
FIGS. 11A and 11B are is diagrams each explaining the relationship between a conduction resistance between an output terminal and an input terminal of the inverter and a torque of an AC rotary electric machine connected to the inverter.

However, in the lower arm three-shunt current detection type inverter shown in FIG. 9, since the conduction resistance between the output terminal and the negative-electrode-side input terminal of the inverter is "Rn+R", and the conduction resistance between the output terminal and the positive-electrode-side input terminal of the inverter is Rp, it can be confirmed that, as seen from the waveform of a torque T in a lowermost row of FIG. 11A, unbalance between the conduction resistances has led to superimposition, on fundamental wave components of the corrected voltage command values Vuo, Vvo, and Vwo (or fundamental wave components of currents Iu, Iv, and Iw flowing through the AC rotating machine 1 in a second row), of pulsations of a component having a frequency that is three times the frequencies of the fundamental wave components.

Figure 11B:
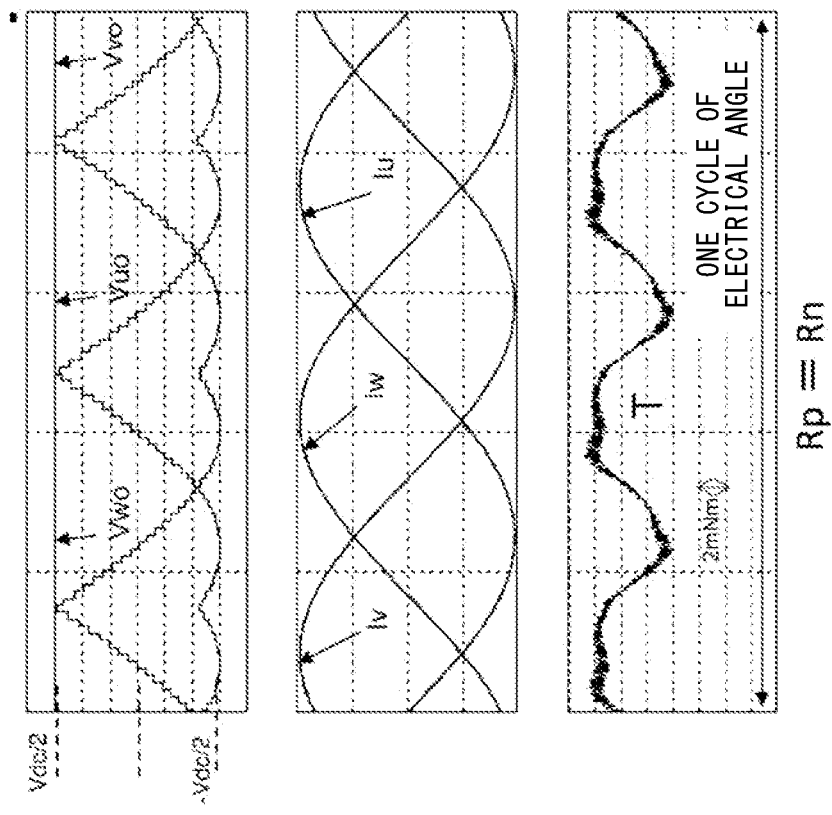

Considering this, in the present embodiment, the conduction resistance Rp between the output terminal and the positive-electrode-side input terminal of the inverter is set to be higher than the conduction resistance Rn (excluding the current detection resistance element) between the output terminal and the negative-electrode-side input terminal of the inverter (Rp>Rn) as described in detail in embodiment 1 in order to maintain the accuracy of current detection which is the advantage of the upper solid two-phase modulation, and furthermore, reduce a third-order harmonic component caused by unbalance between the conduction resistances. FIG. 11B shows the waveforms of respective components in the case of setting the conduction resistances so as to satisfy Rp>Rn. With a focus on a torque T in a third row, it is seen that the third-order harmonic component has been made lower than that in FIG. 11A.

As described above, the lower arm three-shunt current detection type is combined with the upper solid two-phase modulation, and the conduction resistance Rp between the output terminal and the positive-electrode-side input terminal of the inverter is set to be higher than the conduction resistance Rn (excluding the current detection resistance element) between the output terminal and the negative-electrode-side input terminal of the inverter (Rp>Rn). Consequently, a prominent advantageous effect of being capable of reducing a third-order harmonic component of a torque generated from the AC rotating machine 1 while preventing mixing of switching noises (scraping sounds and noises mixed into an A/D value when a switching time and a current A/D time get close to each other) into a current detection value, is exhibited.

Although the lower arm three-shunt current detection type inverter has been described above, the present embodiment is applicable also to a busbar one-shunt current detection type inverter. The reason is as follows. In the busbar one-shunt current detection type inverter as well, the conduction resistance between the output terminal and the negative-electrode-side input terminal of the inverter is "Rn+R", and the conduction resistance between the output terminal and the positive-electrode-side input terminal of the inverter is Rp, and thus the conduction resistance between the output terminal and the negative-electrode-side input terminal of the inverter is high. Therefore, it is needless to say that the same advantageous effect is obtained also by applying the present embodiment to the busbar one-shunt current detection type inverter.

In addition, in the case where the current detection circuit 8 is configured to be connected in series to the upper-arm switching elements SPu, SPv, and SPw for the three phases so as to detect currents flowing through the switching elements SPu, SPv, and SPw as in FIG. 8 (in the case of employing an upper arm three-shunt current detection type), the corrected voltage command value calculation unit 363a performs calculation as follows in order to prevent a current detection timing and a switching time from getting close to each other.

$$Vmin=MIN(Vuoc, Vvoc, Vwoc)$$

$$Voff=0.5 \times Vdc+Vmin$$

$$Vuo=Vuoc-Voff$$

$$Vvo=Vvoc-Voff$$

$$Vwo=Vwoc-Voff \qquad \text{expression (2-2)}$$

Figure 12:
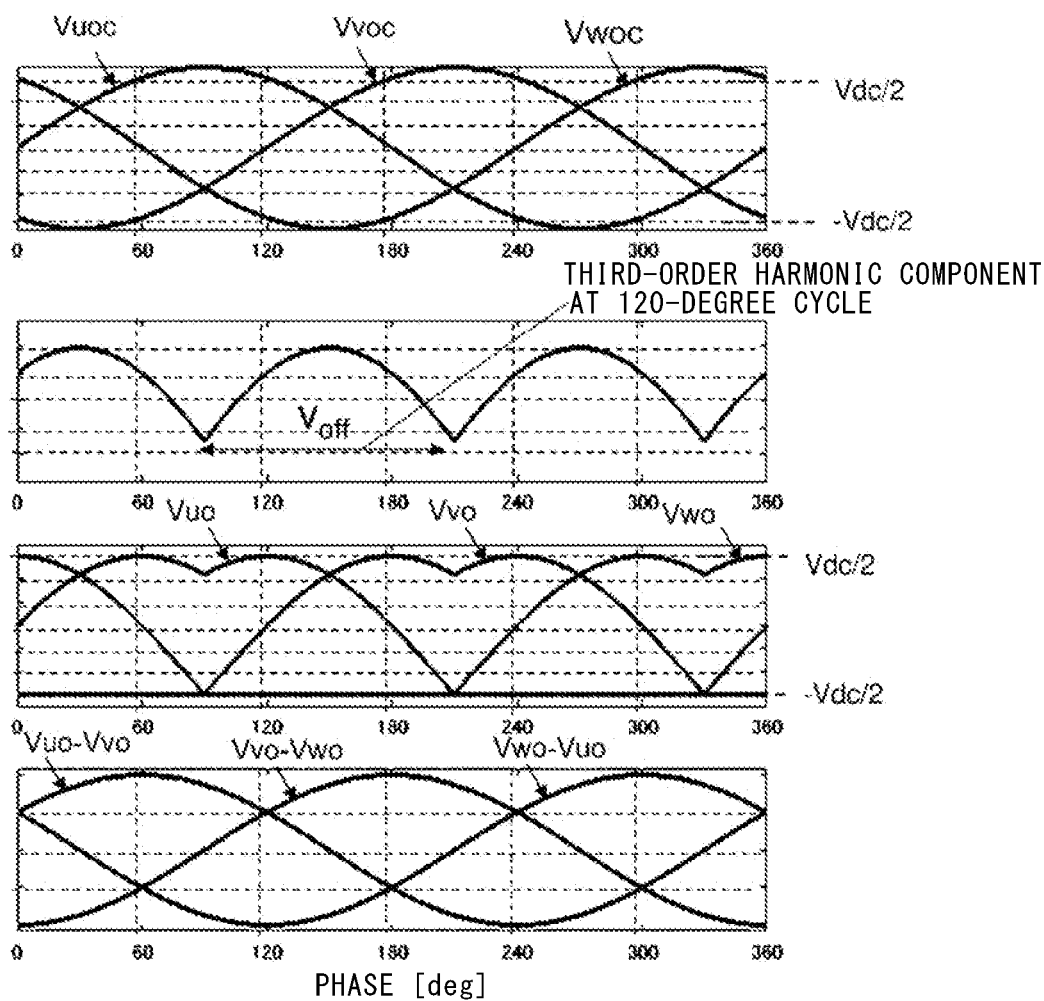
FIG. 12 is another diagram explaining the manner of amplitude reduction modulation performed through calculation by the corrected voltage command value calculation unit, in embodiment 2.

The waveforms of respective components in this case are shown in FIG. 12. FIG. 12 shows, in an upper row, the post-coordinate-conversion voltage command values Vuoc, Vvoc, and Vwoc for the three phases, and shows, in a second row from the upper row, the offset voltage Voff which is found to be a third-order harmonic component fluctuating at a frequency that is three times the frequencies of the voltage command values. FIG. 12 shows, in a third row from the upper row, the corrected voltage command values Vuo, Vvo, and Vwo for the three phases. Lastly, FIG. 12 shows, in a lowermost row, interphase voltage command values Vuo−Vvo, Vvo−Vwo, and Vwo−Vuo. In these drawings, it is seen that any corrected voltage command value having the smallest instantaneous value among the corrected voltage command values Vuo, Vvo, and Vwo for the three phases is equal to "−Vdc/2" which is a lower limit value capable of being outputted from the inverter (lower solid two-phase modulation).

In this case, the conduction resistance between the output terminal and the negative-electrode-side input terminal of the inverter is Rn, and the conduction resistance between the output terminal and the positive-electrode-side input terminal of the inverter is "Rp+R". Thus, if "Rp=Rn" is satisfied, a third-order harmonic is generated in the torque of the AC rotating machine 1 owing to unbalance between the conduction resistances. Considering this, the third-order harmonic component can be reduced by imparting conduction resistances so as to satisfy Rp<Rn.

By combining the upper arm three-shunt current detection type and the lower solid two-phase modulation with each other and setting the conduction resistances in the upper and lower arms to be equal to each other in this manner, deterioration due to a third-order harmonic torque ripple at the time of the lower solid two-phase modulation can be suppressed.

Embodiment 3

Next, an electric power steering device 200 according to embodiment 3 will be described. The power conversion devices 100 have been described in embodiments 1 and 2, and an electric power steering device may be configured with either of the power conversion devices 100 so as to generate a torque that provides assistance for steering torque. Embodiment 3 differs from embodiments 1 and 2 in terms of a steering wheel 901, front wheels 902, a gear 903, a torque detector 904, and a motor torque target value calculation unit 905. In the following description, the differences from embodiments 1 and 2 will be described.

Figure 13:
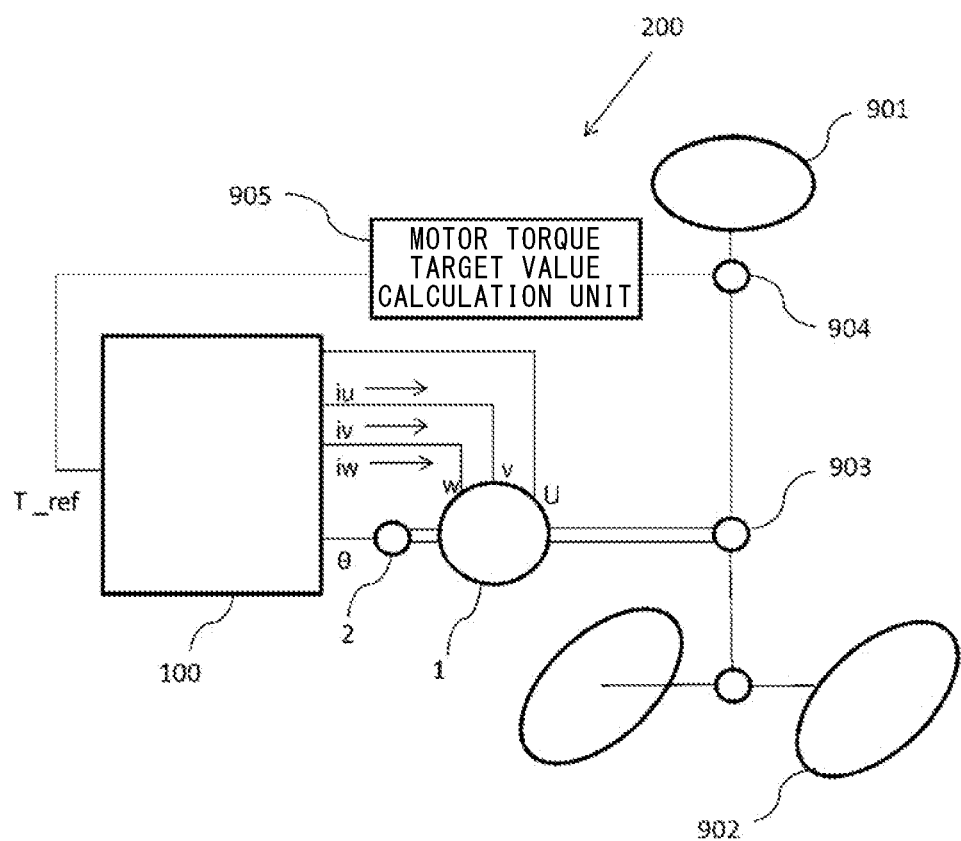
FIG. 13 is a schematic configuration diagram in which either of the power conversion devices has been applied to an electric power steering device according to embodiment 3.

FIG. 13 is a diagram explaining a configuration of the electric power steering according to embodiment 3. In FIG. 13, a driver rotates the steering wheel 901 to the left or right, to turn the front wheels 902. The torque detector 904 detects a steering torque of a steering system and outputs the detected torque to the motor torque target value calculation unit 905. The motor torque target value calculation unit 905 calculates, on the basis of the torque detected by the torque detector 904, a target value T_ref for the motor torque as a control command to be outputted to the AC rotating machine 1 such that the AC rotating machine 1 generates a torque T that provides assistance for the steering torque of the steering system. The target value T_ref is inputted to the current command value calculation unit 35 of the controller 7 composing the power conversion device 100, whereby the AC rotating machine 1 is controlled via the inverter 6 according to the target value T_ref. The AC rotating machine 1 generates the torque that provides assistance for the steering torque via the gear 903.

For such an electric power steering device, importance is placed on silence, device cost, and device size. Firstly, from the viewpoint of device cost and device size, it is advantageous to employ current detectors implemented by the "lower arm three-shunt current detection type inverter" and the "busbar one-shunt current detection type inverter". However, since a resistance is provided on a conduction line of the inverter in each of these types, this provision leads to occurrence of unbalance between the conduction resistances of an upper-arm switching element and a lower-arm switching element. Influence of the unbalance emerges upon addition of an offset voltage (third-order harmonic component) to a voltage command value, and a third-order harmonic torque ripple is generated from the AC rotating machine 1. Considering this, in the present embodiment, reduction in influence of this problem is realized by setting the conduction resistance Rp between the output terminal and the positive-electrode-side input terminal of the inverter to be higher than the conduction resistance Rn (excluding the current detection resistance element) between the output terminal and the negative-electrode-side input terminal of the inverter (Rp>Rn) as described in embodiment 1.

It is noted that the same advantageous effect is obtained also in the "upper arm three-shunt current detection type". That is, reduction in influence of this problem can be realized by setting the conduction resistance Rn between the output terminal and the negative-electrode-side input terminal of the inverter to be higher than the conduction resistance Rp (excluding the current detection resistance element) between the output terminal and the positive-electrode-side input terminal of the inverter (Rn>Rp) as described in embodiment 1.

In the electric power steering device, silence is required as described above, and further, low voltage (12 V) and high current (for example, 100 A) are used. Thus, a voltage pulsation becomes a current pulsation owing to the difference between the conduction resistances on the upper and lower sides of the three-phase inverter, whereby a torque pulsation occurs so as to easily become noise. If either of the power conversion devices described in embodiments 1 and 2 is applied to the electric power steering device, both silence and improvement in a voltage use rate due to superimposition of a third-order harmonic component can be achieved.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1 AC rotating machine
2 rotation detection circuit
6 inverter
7 controller
8 current detection circuit
31 rotation detection unit
32 current detection unit
33 current coordinate conversion unit
35 current command value calculation unit
37 PWM control unit
100 power conversion device
200 electric power steering device
361 dq-axis voltage command value calculation unit
362 voltage coordinate conversion unit
363, 363a corrected voltage command value calculation unit
901 steering wheel
902 front wheel
903 gear
904 torque detector
905 motor torque target value calculation unit

The invention claimed is:

1. A power conversion device comprising:
an inverter which has an upper-arm switch and a lower-arm switch and which converts a DC voltage into an AC voltage and outputs the AC voltage to a load;
a voltage command value calculator which calculates a voltage command value for controlling the load to take a commanded state;
a corrected voltage command value calculator which calculates a corrected voltage command value by adding, to a fundamental wave component of the voltage command value, a third-order harmonic component which is a component having a frequency that is three times a frequency of the fundamental wave component; and
a current detection circuit having a current detection resistance and that is connected between either the lower-arm switch and a negative-electrode-side input terminal of the inverter or the upper-arm switch and a positive-electrode-side input terminal of the inverter, wherein
the inverter performs conversion into the AC voltage on the basis of the corrected voltage command value,
based on the current detection circuit being connected between the lower-arm switch and the negative-electrode-side input terminal of the inverter, a conduction resistance between an output terminal and the positive-electrode-side input terminal of the inverter is set to be higher than a first conduction resistance value that excludes the current detection resistance of the current detection circuit from a conduction resistance between the output terminal and the negative-electrode-side input terminal of the inverter, and
based on the current detection circuit being connected between the upper-arm switch and the positive-electrode-side input terminal, the conduction resistance between the output terminal and the negative-electrode-side input terminal of the inverter is set to be higher than a second conduction resistance value that excludes the current detection resistance of the current detection circuit from the conduction resistance between the output terminal and the positive-electrode-side input terminal of the inverter.

2. The power conversion device according to claim 1, wherein
based on the current detection circuit being connected between the lower-arm switch and the negative-electrode-side input terminal, a conduction resistance of the upper-arm switch is set to be higher than a conduction resistance of the lower-arm switch.

3. The power conversion device according to claim 1, wherein
based on the current detection circuit being connected between the lower-arm switch and the negative-electrode-side input terminal, an ON command signal for the upper-arm switch is set to be lower than an ON command signal for the lower-arm switch.

4. The power conversion device according to claim 2, wherein
the corrected voltage command value calculator calculates the third-order harmonic component such that a largest one of the corrected voltage command values is equal to an upper limit value capable of being outputted from the inverter.

5. The power conversion device according to claim 4, wherein
the inverter is a three-phase inverter comprising three resistors, and
the three resistors are interposed between the negative-electrode-side input terminal and the respective lower-arm switches for respective phases.

6. The power conversion device according to claim 1, wherein
based on the current detection circuit being connected between the upper-arm switch and the positive-electrode-side input terminal, a conduction resistance of the lower-arm switch is set to be higher than a conduction resistance of the upper-arm switch.

7. The power conversion device according to claim 1, wherein
based on the current detection circuit being connected between the upper-arm switch and the positive-electrode-side input terminal, an ON command signal for the lower-arm switch is set to be lower than an ON command signal for the upper-arm switch.

8. The power conversion device according to claim 6, wherein
the corrected voltage command value calculator calculates the third-order harmonic component such that a smallest one of the corrected voltage command values is equal to a lower limit value capable of being outputted from the inverter.

9. The power conversion device according to claim 8, wherein
the inverter is a three-phase inverter comprising three resistors, and
the three resistors are interposed between the positive-electrode-side input terminal and the respective upper-arm switches for respective phases.

10. An electric power steering device comprising:
the power conversion device according to claim 1;
the load which is an AC rotating machine; and
a drive force transmission mechanism which transmits drive force for the AC rotating machine to a steering device of a vehicle.

11. The power conversion device according to claim 2, wherein
based on the current detection circuit being connected between the lower-arm switch and the negative-electrode-side input terminal, an ON command signal for the upper-arm switch is set to be lower than an ON command signal for the lower-arm switch.

12. The power conversion device according to claim 3, wherein
the corrected voltage command value calculator calculates the third-order harmonic component such that a largest one of the corrected voltage command values is equal to an upper limit value capable of being outputted from the inverter.

13. The power conversion device according to claim 11, wherein
the corrected voltage command value calculator calculates the third-order harmonic component such that a largest one of the corrected voltage command values is equal to an upper limit value capable of being outputted from the inverter.

14. The power conversion device according to claim 2, wherein
based on the current detection circuit being connected between the upper-arm switch and the positive-electrode-side input terminal, an ON command signal for the lower-arm switch is set to be lower than an ON command signal for the upper-arm switch.

15. The power conversion device according to claim 7, wherein
the corrected voltage command value calculator calculates the third-order harmonic component such that a smallest one of the corrected voltage command values is equal to a lower limit value capable of being outputted from the inverter.

16. The power conversion device according to claim 14, wherein
the corrected voltage command value calculator calculates the third-order harmonic component such that a smallest one of the corrected voltage command values is equal to a lower limit value capable of being outputted from the inverter.

17. An electric power steering device comprising:
the power conversion device according to claim 2;
the load which is an AC rotating machine; and
a drive force transmission mechanism which transmits drive force for the AC rotating machine to a steering device of a vehicle.

18. An electric power steering device comprising:
the power conversion device according to claim 6;
the load which is an AC rotating machine; and
a drive force transmission mechanism which transmits drive force for the AC rotating machine to a steering device of a vehicle.

* * * * *